Aug. 8, 1933. E. R. WHARTON 1,921,556
LUBRICATING DEVICE FOR BEARINGS
Filed March 13, 1931

Inventor=
Edward R. Wharton,
By Arthur F. Randall
Atty.

Patented Aug. 8, 1933

1,921,556

UNITED STATES PATENT OFFICE 1,921,556

LUBRICATING DEVICE FOR BEARINGS

Edward R. Wharton, Medford, Mass.

Application March 13, 1931. Serial No. 522,206

8 Claims. (Cl. 308—120)

My invention relates to devices for lubricating bearings and it has for its object to provide an efficient, simple and inexpensive bearing-lubricating device of improved construction and mode of operation.

To these ends I have provided a lubricating device including a container that is connected with and carried by one of the elements of the mechanism that is to be lubricated.

This container is made with a horizontal delivery conduit leading to the bearing that is to be lubricated, and in addition to serving as a holder for a fluid lubricant it also incloses and houses an eccentrically weighted gravity-controlled conduit terminal member that is pivotally or rotatably supported by the container so as to turn freely with relation thereto on an axis coincident with said delivery conduit so that it is continually held by gravity against rotation relatively to a vertical plane extending through said axis and with its lower portion submerged in the fluid lubricant; however, said container may be rotated on said axis.

In the best form of my invention the container and gravity controlled member are connected by means of a horizontally disposed trunnion provided on one of said parts that is rotatably mounted and confined within a socket provided upon the other part.

The gravity-controlled member is made with a port or conduit extending from the lower end or portion thereof upward to, or to a point adjacent, the axis on which said two members rotate relatively where it communicates with the horizontal conduit of the container.

Associated with the gravity-controlled member and container is a wick occupying the two conduits above referred to. The body of fluid lubricant provided within the container is held by gravity at the bottom thereof and, therefore, the part of the wick within the conduit of the gravity-controlled member is submerged therein. Thus through capillary attraction the fluid lubricant is conducted by the wick from the container to the joint or bearing that is to be lubricated.

Other features of my invention are hereinafter pointed out.

Figure 1:
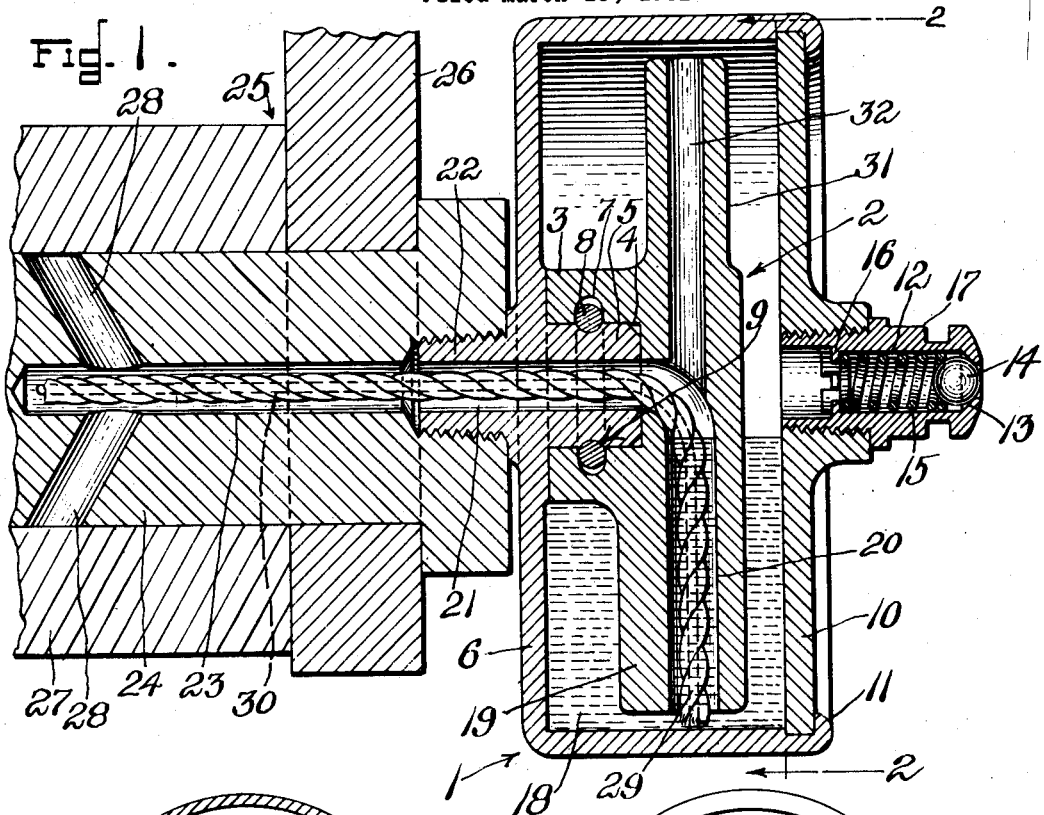
Figure 1 is a central vertical sectional view, enlarged, of a lubricating device constructed in accordance with my invention.
Figure 2:
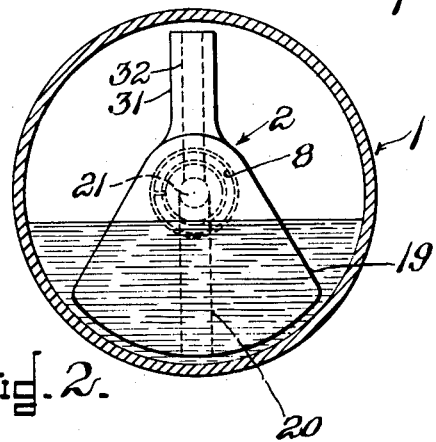
Figure 2 is a section on line 2—2 of Fig. 1, on reduced scale.
Figure 3:
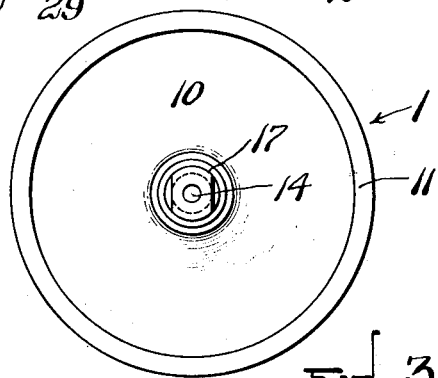
Figure 3 is an outer end elevation of the container.
Figure 4:
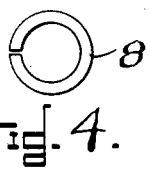
Figure 4 is an elevation of the split ring hereinafter described.

The embodiment of my invention herein illustrated comprises a cylindrical container 1 within which is arranged a gravity-controlled member 2. The member 2 is made with a hub 3 formed with a horizontal cylindrical socket 4 within which is rotatably mounted a trunnion 5 provided upon the rear wall 6 of the container 1.

Within the socket 4 the hub 3 is formed with an annular groove 7 that is occupied by the outer portion of a split ring 8 whose inner portion occupies an annular groove 9 provided upon the exterior of the trunnion 5. Before the gravity-controlled member 2 is placed in position upon the trunnion 5 the split ring 8 is sprung into the groove 7 thereof and then as the hub of said member is slid endwise on to the trunnion said ring 8 is first expanded by the trunnion and then when the hub is fully in position on the same the ring 8 contracts into the groove 9 of the trunnion thereby permanently securing the hub on the trunnion so as to provide for free relative rotative movement of the two.

The cylindrical container 1 is counterbored at its outer end to receive a circular front wall plate 10 which is permanently fastened in place by turning the chime of the container inwardly against the same as shown at 11.

At its middle the front wall 10 is made with a filler port 12 extending therethrough at the outer end of which is provided a seat 13 for an inwardly opening ball check-valve 14 which is yieldingly held on said seat by a coiled spring 15 whereof one end abuts the ball check-valve 14 and the opposite end abuts lugs 16 projecting radially inwardly from the wall surrounding the conduit 12. As herein shown the conduit 12 is the bore of a nipple 17 whereof one end portion is exteriorly threaded and screwed into a threaded hole provided at the middle of the front wall 10. This nipple, including its valve and spring is shown as constructed the same as the nipples that are provided upon receiving fixtures such as heretofore used in connection with grease guns and the like by which grease or oil is delivered to bearings, the outer end of said nipple being made upon its exterior with two oppositely disposed radial lugs, as usual, to interlock with the nozzle of the gun.

In using a gun in connection with my improved lubricating device the outlet nozzle of the same is coupled to the nipple and then the gun is operated to force oil under pressure through the conduit 12 into the container 1 where it collects in a body 18 at the bottom of the latter. As will be clear the supply of oil within the container 1 can be replenished at will through the nipple.

The lower portion of the gravity-controlled member 2 is constituted by a relatively heavy body of metal 19 through which is provided a vertical port or conduit 20 opening at its lower end into the interior of the container and communicating at its upper end with a port or conduit 21 provided through the trunnion 5 and which leads to the bearing that is to be lubricated. The rear end portion of this port or conduit 21 extends through an exteriorly threaded nipple 22 provided upon the rear side of the container 1.

Herein I have shown the nipple 22 of the container screwed into the interiorly threaded outer end portion of a port or conduit 23 extending longitudinally through the middle of the pintle 24 of a spring shackle 25 such as is provided upon automobiles. At 26 is shown one of the links of the shackle and at 27 a bearing that is occupied by the pintle 24. The port or conduit 23 is provided with radial branches 28 terminating at the periphery of pintle 24.

Within the ports or conduits 20, 21 and 23 is arranged a fibrous wick 29 which may be provided with a metal wire core 30 and, as shown in Fig. 1, one end portion of this wick is submerged in the body of oil 18. It will therefore be clear that by reason of capillary attraction oil will be conducted by wick 29 from the container 1 to the end portion of said wick that is within the pintle 24 and from said end portion it will be delivered through the branch ports 28 to the bearing joint between the pintle and the element 27.

The spring shackles of automobiles are constructed so that the pintle 24 is interlocked with the link 26 so as to rock with the latter relatively to the bearing 27 and so that the pintle turns back and forth within said bearing. It will be clear, however, that as the pintle 24 and the container 1 are thus turned on the axis of the latter the weighted portion 19 of the gravity-controlled member remains in the same vertical position below said axis, the trunnion 5 turning freely within the socket 4.

At its top the gravity-controlled member is made with an upwardly extending tubular arm or extension 31 whose interior port or conduit 32 communicates at its lower end with the upper end of the conduit 20 thereby providing a vent which ensures that the level of the oil within said conduit 20 will at all times be the same as the level of the oil outside of the weight 19.

From the above description it will be clear that my improved lubricating device is applicable to movable machine elements of various kinds and that so long as the same is oscillated or rotated on an axis parallel with the axis of trunnion 5, or approximately so, the gravity-controlled conduit terminal member 2 will automatically and continually maintain itself in a vertical position where the upper end of vent 32 is above the level of the body of fluid lubricant 18 and the lower end of the conduit 20 is below said level. It will also be clear that it is not essential to this mode of operation that the axis of oscillation or rotation of the device be coincident with the axis of the trunnion 5.

What I claim is:

1. A device for lubricating bearings comprising a container adapted to be connected with and carried by a rotatively movable element of the mechanism to be lubricated, said container serving as a holder for a body of fluid lubricant and having a side wall made with a horizontal delivery conduit leading to the bearing that is to be lubricated; an eccentrically weighted gravity-controlled conduit terminal member within said container rotatably and directly mounted upon said side wall so as to turn freely with relation thereto on a horizontal axis coincident with the inlet end of said delivery conduit so that it is continually held by gravity against rotation relatively to a vertical plane extending through said axis with its lower weighted portion submerged in the fluid lubricant, said lower weighted portion being made with a conduit extending from the bottom thereof upwardly to the inlet end of the horizontal delivery conduit of said container, and a wick loosely occupying the said two conduits with its lower end portion held submerged within said body of fluid lubricant by said gravity-controlled conduit terminal member.

2. A device for lubricating bearings constructed in accordance with claim 1 wherein said container and said terminal member are rotatably connected by means of a trunnion provided on one of said elements occupying a socket provided in the other of said elements, the axis of said trunnion being horizontal and coincident with the inlet end of the horizontal conduit of said container and also coincident with the upper end of the conduit of said terminal member.

3. A device for lubricating bearings constructed in accordance with claim 1, wherein said container and said terminal member are rotatably connected by means of a trunnion provided on one of said elements occupying a socket provided in the other of said elements, the axis of said trunnion being horizontal and coincident with the inlet end of the horizontal delivery conduit of said container and also coincident with the upper end of the conduit of said terminal member, and wherein means is provided by which said trunnion is rotatably confined within said socket.

4. A device for lubricating bearings constructed in accordance with claim 1 wherein said container and said terminal member are rotatably connected by means of a trunnion provided on one of said elements occupying a socket provided in the other of said elements, the axis of said trunnion being horizontal and coincident with the inlet end of the horizontal delivery conduit of said container and also coincident with the upper end of the conduit of said terminal member, and wherein a split ring surrounding said trunnion is provided by which said trunnion is permanently latched within said socket, said split ring occupying an annular groove provided on said trunnion and an annular groove provided on said terminal member within said socket.

5. A device for lubricating bearings constructed in accordance with claim 1 wherein said container includes a wall made with a filler port extending therethrough and including also an inwardly opening check valve within and controlling said port, and a spring normally holding said valve closed.

6. A device for lubricating bearings constructed in accordance with claim 1 wherein said container is made with a back wall through whch said horziontal delivery conduit extends, said back wall being formed with an exteriorly threaded nipple surrounding the delivery end portion of said horizontal conduit, and wherein another wall of said container is made with a filler port extending therethrough, an inwardly opening check valve within and controlling said port and a spring normally holding said valve closed.

7. A device for lubricating bearings constructed in accordance with claim 1 wherein said container includes a wall made with a filler port extending therethrough and including also an inwardly opening check valve within and controlling said port, a spring normally holding said valve closed, and a nipple upon the exterior of said wall surrounding the inlet end portion of said port and having means by which it is interlocked with and coupled to, the delivery nozzle of a gun.

8. A device for lubricating bearings constructed in accordance with claim 1 wherein said conduit terminal member is made with a vent port extending upwardly from the upper end portion of the conduit of said terminal member.

EDWARD R. WHARTON.